United States Patent
Tamari et al.

(10) Patent No.: US 12,530,023 B2
(45) Date of Patent: Jan. 20, 2026

(54) APPARATUS DIAGNOSTIC SYSTEM, APPARATUS DIAGNOSTIC APPARATUS, SEMICONDUCTOR DEVICE MANUFACTURING SYSTEM, AND APPARATUS DIAGNOSTIC METHOD

(71) Applicant: Hitachi High-Tech Corporation, Tokyo (JP)

(72) Inventors: Nanako Tamari, Tokyo (JP); Masahiro Sumiya, Tokyo (JP); Akira Kagoshima, Tokyo (JP); Satoru Matsukura, Tokyo (JP); Yuji Nagatani, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 188 days.

(21) Appl. No.: 18/026,201

(22) PCT Filed: Mar. 24, 2022

(86) PCT No.: PCT/JP2022/014006
§ 371 (c)(1),
(2) Date: Mar. 14, 2023

(87) PCT Pub. No.: WO2023/181265
PCT Pub. Date: Sep. 28, 2023

(65) Prior Publication Data
US 2024/0310827 A1 Sep. 19, 2024

(51) Int. Cl.
*G05B 23/02* (2006.01)
*G05B 19/048* (2006.01)
*H01L 21/67* (2006.01)

(52) U.S. Cl.
CPC ....... *G05B 23/0283* (2013.01); *G05B 19/048* (2013.01); *G05B 23/024* (2013.01);
(Continued)

(58) Field of Classification Search
CPC ............ G05B 23/0283; G05B 23/0205; G05B 23/0275; G05B 23/0281; G05B 23/024;
(Continued)

(56) References Cited

U.S. PATENT DOCUMENTS

| | | |
|---|---|---|
| 6,658,423 B1 | 12/2003 | Pugh et al. |
| 2003/0019839 A1 | 1/2003 | Yamamoto et al. |

(Continued)

FOREIGN PATENT DOCUMENTS

| | | |
|---|---|---|
| EP | 3819930 A1 | 5/2021 |
| JP | 2000-259222 A | 9/2000 |

(Continued)

OTHER PUBLICATIONS

Search Report mailed Jun. 14, 2022 in International Application No. PCT/JP2022/014006.
(Continued)

*Primary Examiner* — Manuel L Barbee
(74) *Attorney, Agent, or Firm* — Miles & Stockbridge, P.C.

(57) ABSTRACT

An apparatus diagnostic system for diagnosing conditions of a semiconductor manufacturing apparatus includes an apparatus diagnostic apparatus that outputs soundness indicators by a first algorithm with sensor data collected from the semiconductor manufacturing apparatus as an input to the first algorithm, outputs threshold spatial data under normal conditions of the semiconductor manufacturing apparatus by a second algorithm with the soundness indicators as an input to the second algorithm, and diagnoses conditions of the semiconductor manufacturing apparatus by a third algorithm with the soundness indicators and the threshold spatial data as an input to the third algorithm. The soundness indicators are indicators concerning a degree of soundness of conditions of the semiconductor manufacturing apparatus.

12 Claims, 4 Drawing Sheets

(52) U.S. Cl.
CPC ............... *H01L 21/67253* (2013.01); *G05B 2219/45031* (2013.01)

(58) Field of Classification Search
CPC ........ G05B 19/048; G05B 2219/45031; H01L 21/67253
See application file for complete search history.

(56) References Cited

U.S. PATENT DOCUMENTS

| | | | |
|---|---|---|---|
| 2003/0045009 | A1 | 3/2003 | Tanaka et al. |
| 2003/0199108 | A1 | 10/2003 | Tanaka et al. |
| 2004/0149208 | A1 | 8/2004 | Shiraishi et al. |
| 2004/0235304 | A1 | 11/2004 | Oh |
| 2004/0259276 | A1 | 12/2004 | Yue et al. |
| 2004/0268151 | A1* | 12/2004 | Matsuda ............ G06F 21/6218 726/11 |
| 2005/0004683 | A1 | 1/2005 | Yamazaki |
| 2005/0006344 | A1 | 1/2005 | Tanaka |
| 2005/0010318 | A1 | 1/2005 | Lev-Ami et al. |
| 2005/0146709 | A1 | 7/2005 | Oh et al. |
| 2005/0154482 | A1 | 7/2005 | Tomoyasu |
| 2006/0160256 | A1 | 7/2006 | Obi et al. |
| 2006/0260746 | A1 | 11/2006 | Ikuhara et al. |
| 2007/0043534 | A1 | 2/2007 | Arruda et al. |
| 2007/0162172 | A1 | 7/2007 | Tanaka et al. |
| 2008/0125898 | A1 | 5/2008 | Harvey et al. |
| 2016/0189931 | A1 | 6/2016 | Nozawa |
| 2017/0040177 | A1 | 2/2017 | Sasaki et al. |
| 2017/0256463 | A1 | 9/2017 | Bailey, III et al. |
| 2018/0267512 | A1 | 9/2018 | Yamamoto |
| 2019/0088455 | A1* | 3/2019 | Kamaji ................ G06N 7/00 |
| 2019/0218663 | A1 | 7/2019 | Funakubo et al. |
| 2020/0064820 | A1* | 2/2020 | Ishiguro ........... G05B 19/41885 |
| 2020/0243359 | A1 | 7/2020 | Hao et al. |
| 2020/0251360 | A1 | 8/2020 | Liao et al. |
| 2023/0400847 | A1* | 12/2023 | Guo .................. G05B 23/0283 |

FOREIGN PATENT DOCUMENTS

| | | |
|---|---|---|
| JP | 2002-016123 A | 1/2002 |
| JP | 2003-045847 A | 2/2003 |
| JP | 2004-241499 A | 8/2004 |
| JP | 2006-086325 A | 3/2006 |
| JP | 2006-202912 A | 8/2006 |
| JP | 2006-324316 A | 11/2006 |
| JP | 2007-502026 A | 2/2007 |
| JP | 2007-531922 A | 11/2007 |
| JP | 2008-034877 A | 2/2008 |
| JP | 2009-505425 A | 2/2009 |
| JP | 2010-501091 A | 1/2010 |
| JP | 2010-225632 A | 10/2010 |
| JP | 2016-122772 A | 7/2016 |
| JP | 2018-083958 A | 5/2018 |
| JP | 2018-156994 A | 10/2018 |
| JP | 2019-125686 A | 7/2019 |
| JP | 2020-031096 A | 2/2020 |
| JP | 6696059 B1 | 5/2020 |
| WO | 2004105101 A2 | 12/2004 |
| WO | 2015178348 A1 | 11/2015 |
| WO | 2020159730 A1 | 8/2020 |
| WO | 2020188747 A1 | 9/2020 |
| WO | 2021065295 A1 | 4/2021 |
| WO | 2021241242 A1 | 12/2021 |

OTHER PUBLICATIONS

Office Action mailed Apr. 20, 2021 in Japanese Application No. 2018-154589.
I.T. Jolliffe, "Discarding Variables in a Principal Component Analysis I", Journal of the Royal Statistics Society Series C, vol. 21, No. 2, pp. 160-173, 1972.
Office Action mailed Nov. 11, 2020 in U.S. Appl. No. 16/533,273.
Office Action mailed May 26, 2021 in U.S. Appl. No. 16/533,273.
Office Action mailed Dec. 7, 2021 in U.S. Appl. No. 16/533,273.
Office Action mailed Jun. 27, 2022 in U.S. Appl. No. 16/533,273.
Office Action mailed Jan. 10, 2023 in U.S. Appl. No. 16/533,273.
Search Report mailed Jul. 13, 2021 in International Application No. PCT/JP2021/018152.
Written Opinion mailed Jul. 13, 2021 in International Application No. PCT/JP2021/018152.

* cited by examiner

ID: 12,530,023 B2

APPARATUS DIAGNOSTIC SYSTEM, APPARATUS DIAGNOSTIC APPARATUS, SEMICONDUCTOR DEVICE MANUFACTURING SYSTEM, AND APPARATUS DIAGNOSTIC METHOD

TECHNICAL FIELD

The present invention relates to an apparatus diagnostic system, an apparatus diagnostic apparatus, a semiconductor device manufacturing system, and an apparatus diagnostic method. In particular, the present invention relates to an apparatus diagnostic system that performs a predictive diagnosis and a soundness indicators concerning failure and degradation of plasma etching apparatus by collecting sensor data on the plasma etching apparatus and other apparatus log data and using an arbitrary trigger and an arbitrary analysis algorithm to analyze and learn the data group.

BACKGROUND ART

Increasing the rate of operation and maintaining a high rate of operation of a manufacturing apparatus in a semiconductor manufacturing plant are one of the main issues in view of improvement in productivity and yields in manufacturing processes.

Here, for increasing the rate of operation and maintaining a high rate of operation of the manufacturing apparatus, it is important to reduce the apparatus shutdown time (hereinafter referred to as "downtime") associated with apparatus maintenance in addition to improvements in performance of a manufacturing apparatus itself and performance of a manufacturing process.

In particular, the apparatus maintenance includes non-regular maintenance work unexpectedly required due to any malfunction in the apparatus as well as scheduled regular maintenance. Typically, the non-regular maintenance work involves wait time arising from necessary resource adjustment such as procurement of replacement parts, arrangement of maintenance technicians, and the like, so that a significantly longer downtime than that for the regular maintenance is required.

Therefore, avoidance and prevention of the non-regular maintenance work is one of effective factors responsible for the increased rate of operation of the apparatus.

Also, even in the regular maintenance, if it turns out for the first time during the process of the maintenance work that the apparatus conditions are degraded beyond expectation, a longer downtime is required because the resource adjustment and lowered working efficiency are estimated as in the case of the non-regular maintenance.

Approaches to addressing the above include a method of evaluating a sound state of the apparatus at all times and predictively diagnosing abnormality and degradation of apparatus conditions in order to achieve a significant reduction in apparatus downtime. The full-time monitoring of the apparatus sound state as mentioned here includes, for example, a method of automatically analyzing at all times the state quantity of components making up the apparatus in order to evaluate and predict at all times the degree of soundness and a state change of the components in question.

In plasma etching apparatuses, Japanese Patent Application Laid-Open No. 2000-259222 and Japanese Patent Application Laid-Open No. 2006-324316 are known as a technology to perform preventive maintenance on apparatus using a method as described above.

CITATION LIST

Patent Literature

PTL 1: Japanese Patent Application Laid-Open No. 2000-259222
PTL 2: Japanese Patent Application Laid-Open No. 2006-324316

SUMMARY OF INVENTION

Technical Problem

Along with evolution of semiconductor device structure, components making up an apparatus and production technologies such as an etching process technology and the like are often improved and replaced. Therefore, systems for performing preventive maintenance as described above are also required to be configured flexibly adaptive to the improvement and replacement.

For example, even if a new component and a sensor for measuring a new state quantity are added to an apparatus, modifications of the system are required one by one for data collection and analysis of the component and the sensor, which is undesirable in terms of the rate of operation.

Also, for precisely evaluating a load and/or state of a component itself to be evaluated, for example, the state quantity when the component is not controlled, and/or the state quantity in a specific load event, without limitation to under process execution, such as the closing/opening of a gate valve for closing between a treatment chamber and a transfer chamber may be required in a few instances.

From this perspective, in Japanese Patent Application Laid-Open No. 2000-259222, since the failure prediction algorithm is installed, for example if the specifications of the component to be analyzed conventionally are changed or if a new component is added, the system should be modified. In Japanese Patent Application Laid-Open No. 2006-324316, since the analysis trigger is only recipe information, it is impossible to execute an analysis by any trigger such as the apparatus being in the idle state.

Solution to Problem

The above problems are resolved by a system capable of performing the operation of swapping, deleting, or newly registering an algorithm for analyzing the apparatus state quantity without modification to a system program when the swapping, deleting or newly registering are performed on the system, and also capable of automatically analyzing the state quantity of a component of interest by any event trigger.

Specifically, in a plasma etching apparatus, sensor data obtained by using various sensors to measure the state quantities of components making up the plasma etching apparatus is collected from the sensor group in question via a LAN (local area network) and/or the like by an arbitrary trigger such as a predefined apparatus event trigger and a time interval. Then, a single analysis algorithm or a plurality of analysis algorithms previously registered in the system in question is executed with the collected sensor data as an input to the analysis algorithm (s), and as an output of the analysis, indicators representing respectively the degrees of soundness for various conditions of the apparatus are calculated. The soundness indicators are accumulated in a database, a file and/or the like, and as required a learning algorithm is executed with the soundness indicator group as an input thereto to calculate a reference space under normal operation. With the soundness indicator group and the reference space as an input, a predictive diagnosis is performed on the plasma etching apparatus to be analyzed for preventive maintenance to prevent a malfunction. The data collection and analysis system is achieved by a system capable of being installed with AI (artificial intelligence) to which the aforementioned soundness indicator group and connection data are input as an analysis algorithm and a learning algorithm.

Also, the term "components" as used herein refer to devices and a set of structures making up a plasma etching apparatus system. The components include, for example, the structures making up the plasma etching apparatus system such as a plasma treatment chamber in addition to the devices such as a radio frequency generation circuit.

Advantageous Effects of Invention

According to the present invention, a health state of a component is monitored at all times. And, when the component is under abnormal conditions or abnormality is not reached but predicted, this may be notified to an administer or a worker of the apparatus or the like. Thus, non-regular maintenance itself may be prevented by taking suitable measure before the non-regular maintenance is required. Also, even if the non-regular maintenance is required, since there is room for adjusting the resource in advance, a reduction in downtime as compared to usual non-regular maintenance is expected. Further, the soundness indicator for each component may be visualized and analyzed. Therefore, a basic plan of maintenance in the next regular maintenance may be formulated for each apparatus. Thus, the optimization and efficiency in regular maintenance are enabled, which may contribute to reduction of downtime.

DESCRIPTION OF EMBODIMENTS

Embodiments according to the present invention will now be described with reference to the accompanying drawings.

EXAMPLE

Figure 1:
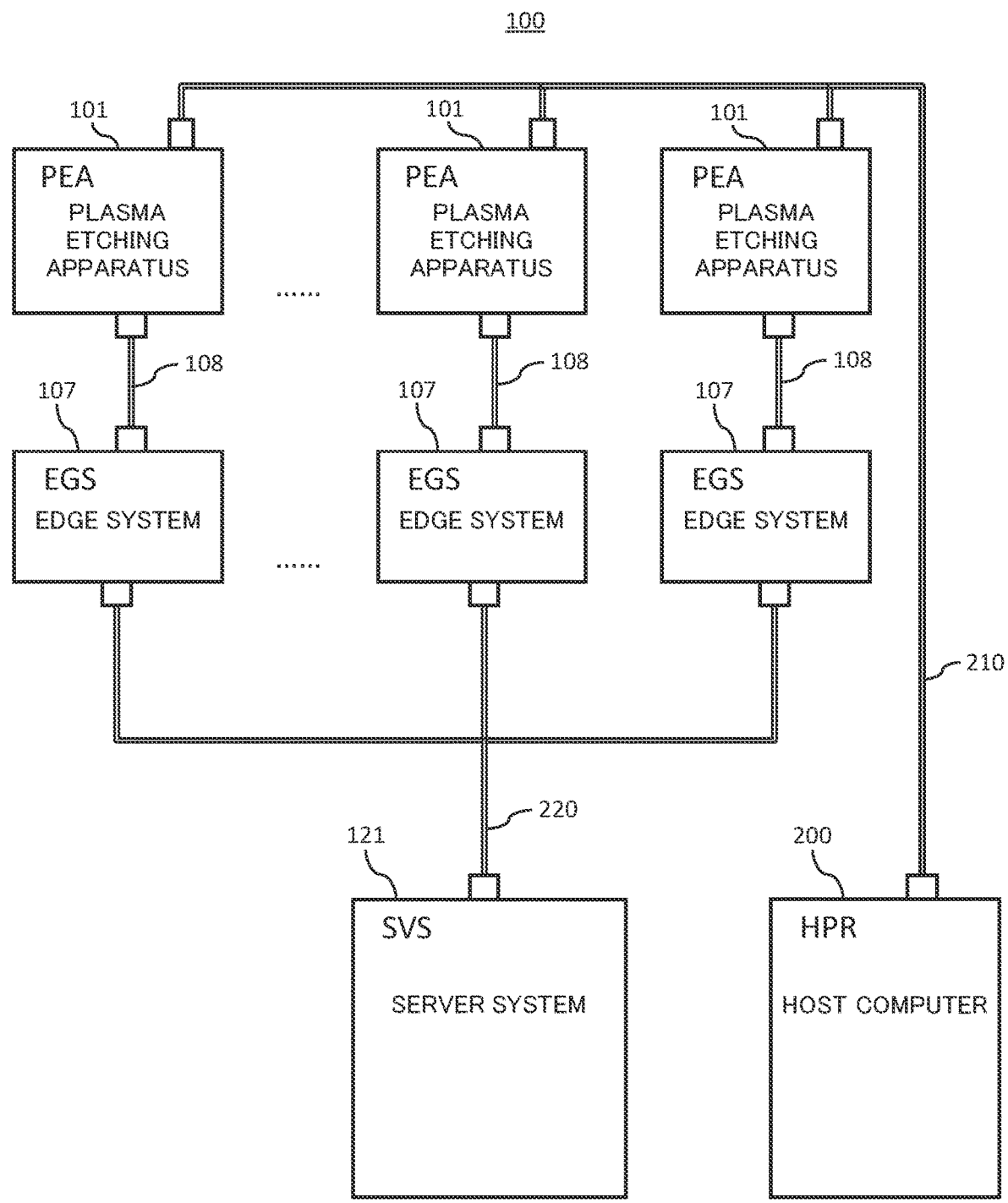
FIG. 1 is an overall view of a semiconductor device manufacturing system including an apparatus diagnostic system which performs predictive diagnosis and evaluation of soundness indicators of a plasma etching apparatus according to examples.
Figure 2:
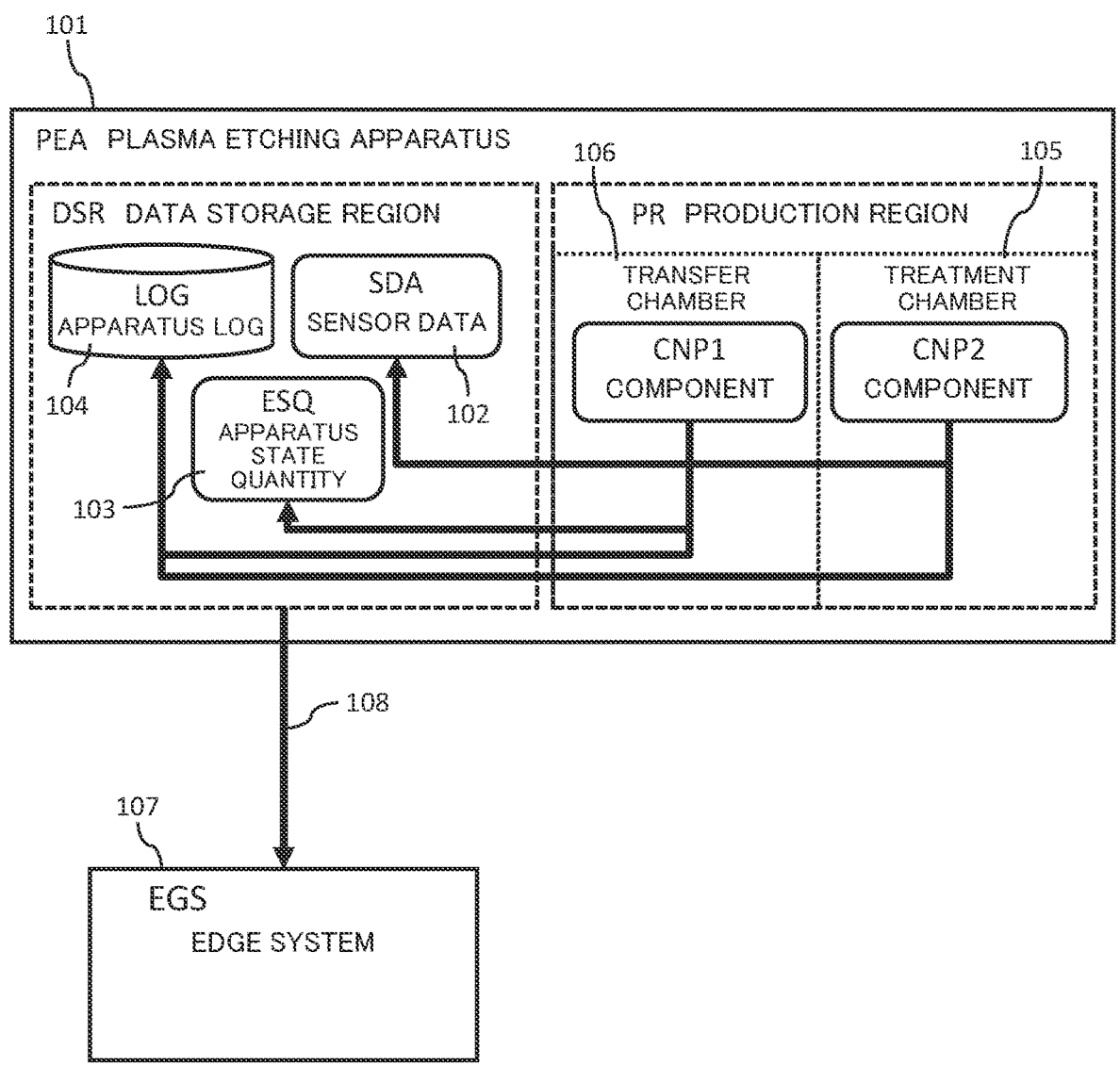
FIG. 2 is a block diagram of the plasma etching apparatus in FIG. 1.
Figure 3:
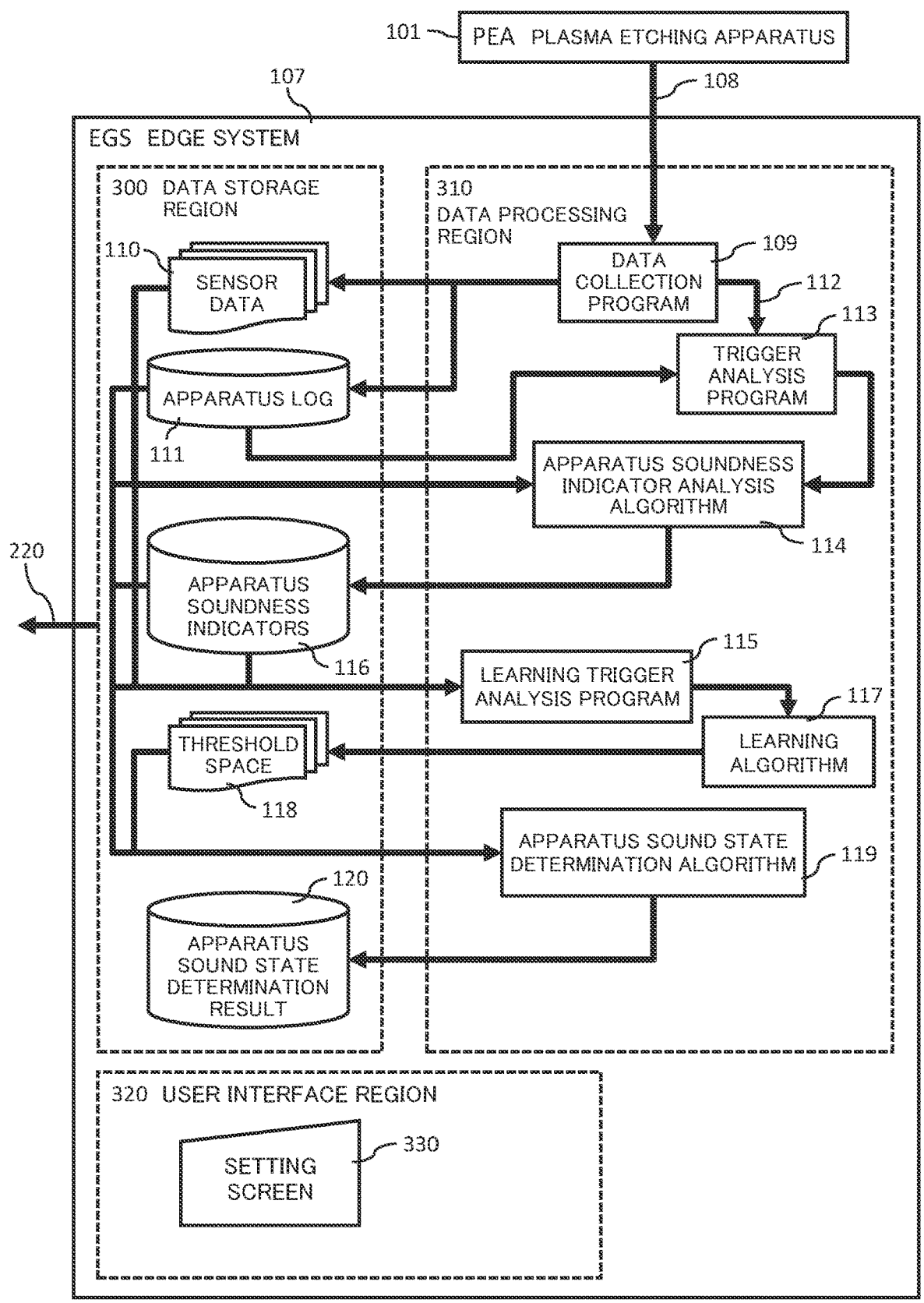
FIG. 3 is a block diagram of an edge system which is an apparatus diagnostic apparatus in FIG. 1.
Figure 4:
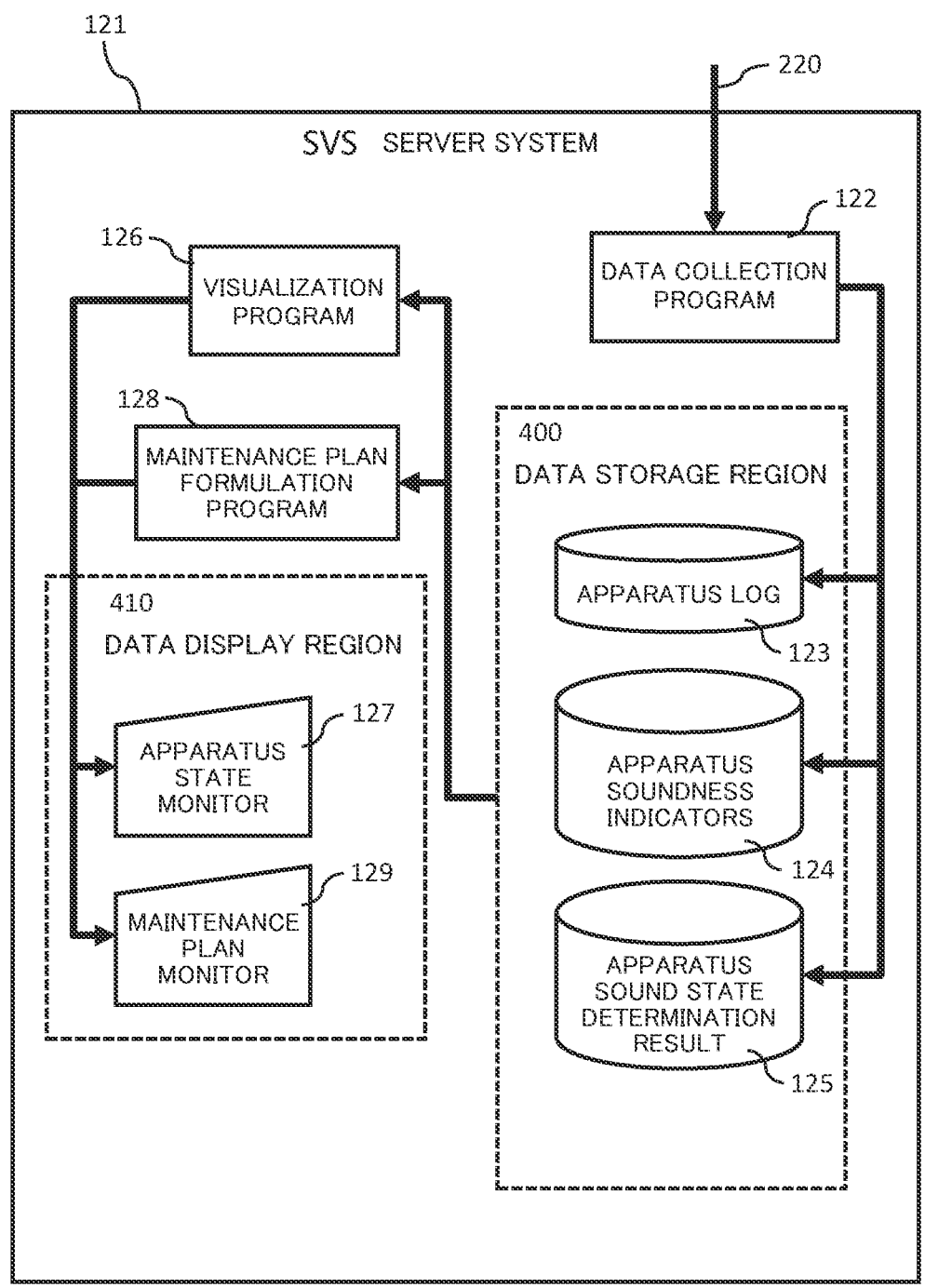
FIG. 4 is a block diagram of a server system in FIG. 1.

Examples according to the present invention will be described. FIG. 1 is an overall view of a semiconductor device manufacturing system including an apparatus diagnostic system which performs predictive diagnosis and evaluation of soundness indicators of plasma etching apparatus according to examples. FIG. 2 is a block diagram of the plasma etching apparatus in FIG. 1. FIG. 3 is a block diagram of an edge system which is an apparatus diagnostic apparatus in FIG. 1. FIG. 4 is a block diagram of a server system in FIG. 1. Arrows shown in FIGS. 2 to 4 indicate a flow of data according to examples of the present invention.

As illustrated in FIG. 1, a semiconductor device manufacturing system 100 includes, in the example, but not limited to, a plurality of plasma etching apparatuses (PEA) 101, a plurality of edge systems (EGS) 107, a server system (SVS) 121, and a host processor (or host computer) (HPR) 200. A single plasma etching apparatus 101 and a single edge system 107 are connected to each other over, for example, a network line using a communication cable 108 such as a LAN (Local Area Network) cable and an USB (Universal Serial Bus) cable. The plurality of edge systems 107 and the server system 121 are connected to each other over, for example, a network line using a communication cable 220 such as a LAN cable and a USB cable. Also, each plasma etching apparatus 101 is connected to the host computer 200 over a network line using a communication cable 210 such as a LAN cable and a USB cable. It is noted that, instead of a wired communication cable such as a LAN cable and a USB cable, the plasma etching apparatus 101, the edge systems 107, and the server system 121 can be connected over a wireless network line.

The server system 121 is installed, for example, in a semiconductor device manufacturing plant (referred to as the "semiconductor device Fab"). Alternatively, the server system 121 is installed in a roofed and walled structure such as a building outside of the semiconductor device Fab, for example, in a roofed and walled structure such as a design building, a test building, and an inspection building of the semiconductor devices.

Here, the plasma etching apparatus (PEA) 101 is a semiconductor manufacturing apparatus for manufacturing semiconductor devices. The edge system 107 may be regarded as an apparatus diagnostic apparatus or an apparatus diagnostic system. The apparatus diagnostic apparatus or the apparatus diagnostic system is utilized to diagnose the conditions of the semiconductor manufacturing apparatus (101). Also, the server system 121 and the edge systems 107 connected to each other via the communication cable 220 may be regarded as the apparatus diagnostic system. The semiconductor manufacturing apparatus and the edge system 107 connected to each other via the communication cable 108 may be regarded as the semiconductor device manufacturing system 100. Also, the semiconductor manufacturing apparatus, the edge system 107 and the server system 121 which are connected to each other via the communication cable 108 may be regarded as the semiconductor device manufacturing system 100.

The edge system 107 may be composed of, for example, a personal computer which is a calculator. The edge system 107 include, for example, an external interface circuit, a processor, memory, a storage, and a display unit. The memory is composed of, for example, fast reading or fast writable semiconductor memory such as RAM (Random Access Memory). The storage is composed of, for example, a mass-storage device such as HDD (Hard Disk Drive) or SSD (Solid State Drive). The processor is configured, for example, to be implemented by a personal computer by executing a software program (also called application program) stored in the storage and implementing the functionality of the edge system 107. Specifically, the functionality of the edge system 107 described in FIG. 3 is implemented by the processor executing the software program stored in the storage and reading various items of reference data stored in the storage. In FIG. 3, a data processing region 310 is implemented by the processor of the personal computer executing the software program. A data storage region 300 is implemented by memory or storage of the personal computer. And a user interface region 320 is implemented by a display unit of the personal computer.

In this sense, the semiconductor device manufacturing system 100 illustrated in FIG. 1 may be regarded as including a platform installed with an application of the apparatus diagnostic apparatus (107) which is connected to the semiconductor manufacturing apparatus (101) over the network for diagnosis of the conditions of the semiconductor manufacturing apparatus (101).

Initially, data groups 102, 103, 104 acquired in the plasma etching apparatus (PEA) 101 are described.

From the viewpoint of the example, as illustrated in FIG. 2, a production region PR of the plasma etching apparatus (PEA) 101 may be broadly classified into: a treatment chamber 105 where a wafer as a sample is subjected to plasma etching treatment and/or the like; and a transfer chamber 106 for carrying the wafer between a wafer cassette and the treatment chamber 105. To each system, various control components CNP are mounted depending on its purpose. For example, as a control component CNP1 placed in the transfer chamber 106, for example, a robot for carrying the wafer, a purge valve for allowing selection between atmosphere and a vacuum, a vacuum pump, and/or the like are installed. As a control component CNP2 placed in the treatment chamber 105, for example, a radio frequency oscillation circuit for generating plasma, a gas flow control device for introducing a process gas into the treatment chamber, a vacuum pump for evacuating the treatment chamber, and/or the like are installed. Also, as a control component placed between the treatment chamber 105 and the transfer chamber 106 which is not shown, a gate valve for closing between both (105 and 106), and/or the like are installed. Typically, the control components are mounted with sensors, so that various state quantities of the components are measured. The state quantity is hereinafter referred to as "sensor data (SDA) 102". The sensor data 102 is stored in a data storage region DSR.

Also, aside from the sensor data 102, there is apparatus state quantity (ESQ) 103 representing a real-time state of the plasma etching apparatus 101. The apparatus state quantity 103 is one type of the sensor data, and is a value specific to an event of the plasma etching apparatus 101 for a principal purpose of representing an open/closed state of a valve and an operating state and a stop state of the plasma etching apparatus 101 and each component, the value being typically expressed in Boolean value, or other integer values. They are stored in the data storage region DSR, and additionally part of the data is retained as command data in memory for a given length of time without being stored.

Further, there is also an apparatus log (LOG) 104 as data that is not included in both the sensor data 102 and the apparatus state quantity 103. The apparatus log (LOG) 104 includes detailed data on apparatus events and/or the like such as a maintenance history of the apparatus 101, information on an executed process recipe, and the like.

For the above-described data groups 102, 103, 104, the edge system 107 that collects and accumulates them, performs a state evaluation, and makes a state determination will be described below.

As illustrated in FIG. 1, the single edge system 107 may be connected to a plurality of plasma etching apparatuses 101. However, an additional facility such as the system has desirably a footprint made as small as possible in terms of a manufacturing site. In this case, typically, since a system with a lower level of throughput is selected instead of a system with a small footprint, it is desirable that a single system is connected to a single plasma etching apparatus 101. Therefore, in the example, an example where a single edge system 107 is connected to a single plasma etching apparatus 101 is described as a representative example.

First, as illustrated in FIG. 1, the plasma etching apparatus 1 and the edge system 107 are interconnected via the communication cable 108. In the example, a LAN cable is used as the communication cable 108 to connect the plasma etching apparatus 101 to the edge system 107 by way of a switching hub.

In a system of connection between the plasma etching apparatus 101 and the edge system 107 via the communication cable 108 in this manner, as illustrated in FIG. 3, initially, a data collection program 109 in the edge system 107 copies data out of the aforementioned sensor data 102 and apparatus log data 104 to a data storage region 300 of the edge system 107 as sensor data 110 and apparatus log data 111, the data having no track record of being copied to the edge system 107 until this point of time. The sensor data 110 is preferably configured, for example, to be collected from the aforementioned sensor data 102 by the data collection program 109, using a trigger corresponding to an operation of each component (CNP1, CNP2, or the like) included in the plasma etching apparatus 101 or a trigger corresponding to a treatment of the plasma etching apparatus 101.

At this time, the sensor data 110 and apparatus log data 111 in question are not required to have the same data format as that of the original data. For example, the data size may be reduced by using a data compression format such as zip or the like; only a feature part of the data extracted by AI (artificial intelligence) or other any algorithm may be stored; the data may be converted and stored into a useful format for performing state evaluation and determination analysis at a later time; and/or file format data may be recorded and stored as a record of a database.

Further, the apparatus state quantity 103 may be stored in the data storage region 300 of the edge system 107. In the example, however, since the apparatus state quantity 103 is used mainly for the purpose of a trigger determination which will be described later, the apparatus state quantity 103 is configured to be passed as an input to a trigger analysis program 113 installed in the data processing region 310 without being stored in the data storage region 300 (see a data flow 112).

The trigger analysis program 113 will be described below. The "trigger" as used herein refers to a trigger for executing an analysis algorithm 114 described later (hereinafter referred to as an "analysis trigger"). For example, when a specific process recipe is performed in the plasma etching apparatus 101, if a specific analysis algorithm is desired to be executed with the sensor data 102 during the recipe execution as an input thereto, the information on the specific process recipe in question becomes an analysis trigger. Also, a specific apparatus event, e.g., at the time of closing/opening a gate valve existing between the treatment chamber 105 and the transfer chamber 106 and the like, a specific time interval irrespective of a specific execution recipe or an apparatus event, and the like, can be set as an analysis trigger. That is, all of information and time information included in the data 110, 111, 103 collected by the data collection program 109 can be set as an analysis trigger.

The trigger analysis program 113 determines whether or not an item preset as an analysis trigger is included in the apparatus state quantity 103 passed from the apparatus log data 111 and the data collection program 109 through the data flow 112.

It is noted that the apparatus log data 111 of interest at this time is about data other than the apparatus log data 111 on which a determination has already been made in the past at a time when the trigger analysis program 113 has read the data group in question, i.e., about a difference data group of the apparatus log data 111.

At this time, regarding the difference data group, if an item preset as an analysis trigger is included, the trigger analysis program 113 immediately executes an apparatus soundness indicator analysis algorithm 114 linked to the analysis trigger. The apparatus soundness indicator analysis algorithm 114 may be referred to as a first algorithm. The first algorithm 114 outputs soundness indicators 116 described later with the sensor data collected from the semiconductor manufacturing apparatus 101 as an input to the first algorithm 114.

It is noted that an item preset as an analysis trigger as used herein means one manually set as an analysis trigger on a setting screen 330 in a user interface region 320 of the system by a system's user, typically, by a field engineer at the production site or the like, or alternatively one preset as an analysis trigger by AI (artificial intelligence) or other any algorithm.

Further, the apparatus soundness indicator analysis algorithm 114 linked to an analysis trigger as used herein means an apparatus soundness indicator analysis algorithm manually linked to the analysis trigger on the setting screen 330 in the user interface region 320 of the system by a system's user, typically, by a field engineer at the production site and/or the like, or alternatively an apparatus soundness indicator analysis algorithm linked to the analysis trigger by AI or other any algorithm.

The apparatus soundness indicator analysis algorithm 114 will be described below.

The algorithm 114 in question is executed by the above-described trigger analysis program 113 with the sensor data 110 and the apparatus log data 111 as an input, the sensor data 110 and the apparatus log data 111 being copied and shaped as necessary by the aforementioned data collection program 109.

At this time, as long as the trigger analysis program 113 fulfills the requirements of a platform for executing the algorithm 114 in question, programming language used to write the algorithm 114 in question is no object. Also, as long as the requirements are fulfilled, the algorithm 114 in question may be AI or any other algorithm. The algorithm 114 in question is also assumed as not being incorporated in the data collection program 109, the trigger analysis program 113, and a learning trigger analysis program 115 included in the edge system 107, and it is assumed in the example as being a dll file or other script file which satisfies the above-described conditions. This aims to implement swapping, deleting and newly registering of the apparatus soundness indicator analysis algorithm 114 without modification to a system program when it is swapped, deleted, or newly registered on the edge system 107.

At this time, the above-described input data (sensor data 110, apparatus log data 111) is analyzed by the algorithm 114 in question to obtain apparatus soundness indicators 116 as an output. The apparatus soundness indicators 116 may be stored as a file. However, for facilitating search and extraction when the apparatus soundness indicators 116 are used as later-described learning data for machine learning and/or the like in a later part, the apparatus soundness indicators 116 are stored in database format in the example. The apparatus soundness indicators 116 are indicators concerning the degree of soundness of conditions of the semiconductor manufacturing apparatus 101. The apparatus soundness indicators 116 are output using machine learning learned by the analysis algorithm 114. The analysis algorithm 114 can analyze and also learn the input data (sensor data 110, apparatus log data 111) using machine learning.

At this time, not only a single algorithm 114 in question but also a plurality of algorithms 114 in question may be registered in the single edge system 107. For example, the algorithms 114 in question can be developed individually for each apparatus component and can be executed respectively by any triggers on the single edge system. Stated another way, the algorithm 114 in question may be composed of, for example, a single algorithm or a plurality of algorithms.

The learning trigger analysis program 115 will be described below.

The learning trigger analysis program 115 determines whether or not the apparatus soundness indicators 116 obtained as the output of the apparatus soundness indicator analysis algorithm 114, and the sensor data 110 and the apparatus log data 111 include data groups satisfying the conditions preset as learning triggers. If the data groups satisfying the conditions in question exist, the learning algorism 117 is executed with the data groups as an input thereto. Here, as in the case of the trigger analysis program 113, all of information and time information included in the data 110, 111, 103 collected by the data collection program 109 can be set as analysis triggers such as a time range such as a specific date and time and the like, a range of production volume from some specific time, and an arbitrary number of occurrences of a specific event. The learning algorithm 117 can also learn the data groups through analysis and machine learning.

Further, as in the case of the trigger analysis program 113, the learning trigger in question means one manually set as an analysis trigger on the setting screen 330 in the user interface region 320 of the system by a system's user, typically, by a field engineer at the production site and/or the like, or alternatively one preset as a filtering criterion by AI or other any algorithm.

The learning algorithm 117 will be described below. The learning algorithm 117 outputs threshold spatial data 118 with data groups as an input thereto, the data groups resulting from filtering the sensor data 110, the apparatus log data 111, and the apparatus soundness indicators 116 on predetermined conditions by the learning trigger analysis program as described earlier. The learning algorithm 117 may be referred to as a second algorithm. The second algorithm 117 outputs the threshold spatial data 118 under normal conditions of the semiconductor manufacturing apparatus 101 with the soundness indicator 116 as an input thereto. The threshold spatial data 118 is output using machine learning learned by the learning algorithm 117.

Here, the threshold spatial data 118 is threshold data for determining whether the apparatus soundness indicators 116 calculated by the apparatus soundness indicator analysis algorithm 114 is normal or abnormal. The threshold special data 118 in question is not one, and typically exists for each component. Specifically, for example, the threshold spatial data 118 of each component is plotted on a corresponding coordinate axis, and the apparatus soundness indicator 116 of each corresponding component is plotted on it. In this case, the apparatus soundness indicators 116 are used to determine that the condition is normal if the apparatus soundness indicator in question is plotted within the threshold space, and to determine that the condition is abnormal if the apparatus soundness indicator in question is plotted outside the threshold space.

The apparatus sound state determination algorithm 119 will be described below. It is determined whether the components corresponding to the soundness indicators 116 are normal or abnormal by using, as inputs, data other than the apparatus soundness indicators 116 data on which the determination has already been made in the past at the time when the apparatus sound state determination algorithm 119 has been executed, i.e., a difference data group of the apparatus soundness indicators 116 in question, and the threshold spatial data 118 of the components respectively corresponding to the soundness indicator group in question. At this time, an apparatus sound state determination result 120 is obtained as an output. At this time the apparatus sound state determination result is typically a Boolean value representing "normal" "with abnormal prediction", but without limitation to the binary "normal" and "with abnormal prediction", the apparatus sound state determination result may be, for example, indicators of "normal", "abnormal prediction", "abnormal". The apparatus sound state determination result 120 obtained here may be stored in the storage such as a database and/or the like, and additionally be transmitted, through the etching apparatus 101, to the host computer 200 that exercises control over and monitors the etching apparatus 101 in question, and further the data is also transmitted to a later-described server system 121. The apparatus sound state determination algorithm 119 may be referred to as a third algorithm. The third algorithm 119 uses the soundness indicators 116 and the threshold spatial data 118 as an input thereto to determine whether the components corresponding to the soundness indicators 116 in question are normal or abnormal in order to diagnose the condition of the semiconductor manufacturing apparatus 101. A diagnosis of the conditions of the semiconductor manufacturing apparatus 101 as the apparatus sound state determination result 120 is performed using machine learning learned by the algorithm 119. For the indicators such as "normal", "abnormal prediction", and "abnormal", the algorithm 119 can also learn through machine learning and analysis of the input data including the soundness indicators 116 and the threshold spatial data 118.

Here, the following may be a brief of an apparatus diagnosis method for diagnosing conditions of a semiconductor manufacturing apparatus. Specifically, the apparatus diagnosis method for diagnosing conditions of the semiconductor manufacturing apparatus (101) has:
1) (process of outputting soundness indicators) a process of outputting soundness indicators (116) by a first algorithm (114) with sensor data (110) collected from the semiconductor manufacturing apparatus (101) as an input to the first algorithm (114);
2) (process of outputting threshold spatial data) a process of outputting threshold spatial data (118) under normal conditions of the semiconductor manufacturing apparatus (101) by a second algorithm (117) with the soundness indicators (116) as an input to the second algorithm (117); and
3) (diagnosis process) a process of diagnosing conditions of the semiconductor manufacturing apparatus (101) by a third algorithm (119) with the soundness indicators (116) and the threshold spatial data (118) as an input to the third algorithm (119).

The following is a brief of a semiconductor device manufacturing system (100) that includes a platform that is connected to a semiconductor manufacturing apparatus (101) via a network and has an application installed therein for diagnosing conditions of the semiconductor manufacturing apparatus (101). That is, the semiconductor device manufacturing system (100) includes:
1) (step of outputting soundness indicators) a first step of outputting soundness indicators (116) by a first algorithm (114) with sensor data (110) collected from the semiconductor manufacturing apparatus (101) as an input to the first algorithm (114);
2) (step of outputting threshold spatial data) a second step of outputting threshold spatial data (118) under normal conditions of the semiconductor manufacturing apparatus (101) by a second algorithm (117) with the soundness indicators (116) as an input to the second algorithm (117); and
3) (diagnosis step) a third step of diagnosing conditions of the semiconductor manufacturing apparatus (101) by a third algorithm (119) with the soundness indicators (116) and the threshold spatial data (118) as an input to the third algorithm (119). Here, the first step, the second step, and the third step are executed by the application for diagnosing the conditions of the semiconductor manufacturing apparatus (101).

Here, where regarding a specific component, the host computer 200 or the server system 121 receives a notification that the component is in an abnormal condition or a condition of predicting abnormality, an administer or a worker of the plasma etching apparatus 101 is able to take immediately necessary measure, so that non-regular maintenance itself is prevented by taking suitable measure before the non-regular maintenance is required. Further, even if the non-regular maintenance results unavoidably, there is room for adjusting the resource in advance. Therefore, a reduction in downtime as compared to usual non-regular maintenance is expected.

The server system 121 will be described below.

As described above, in the example, the single edge system 107 is connected to the single plasma etching apparatus 101. Therefore, a plurality of edge system 107 corresponding to the number of plasma etching apparatuses 101 exist at the manufacturing site.

The server system 121 is a system intended to exercise control over and manage the plurality of edge systems 107, which aims mainly to collect and monitor the apparatus sound state determination result 120, the apparatus soundness indicators 116, and the apparatus log data 111 collected from the edge systems 107, and to receive a notification of the apparatus sound state determination result 120 from the edge systems 107. Stated another way, the server system 121 is provided for collecting the data from the edge systems 107 and making, based on the collected data, an analysis related to preventive maintenance for preventing failure in the plasma etching apparatus 101 or an analysis related to maintenance techniques.

A data collection program 122 in the server system 121 will be descried below.

The data collection program 122 copies data having no track record of being copied from the edge system 107 to the server system 121 until this point of time in the apparatus log data 111, the apparatus soundness indicators 116, and the apparatus sound state determination result 120 of the edge system 107, into a data storage region 400 of the server system 121 as apparatus log 123, apparatus soundness indicators 124, and apparatus sound state determination result 125.

At this time, the apparatus log data 111, the apparatus soundness indicators 116, and the apparatus sound state determination result 120 in question are not required to have the same data format as that of the original data. For example, the data size may be reduced by using a data compression format such as zip, only a feature part of the data extracted by AI or other any algorithm may be stored, the data may be converted and stored into a useful format for performing state evaluation and determination analysis at a later time, and/or file format data may be recorded and stored as a record of a database.

A visualization program 126 will be described below. The visualization program 126 is a processing program for displaying, on an apparatus state monitor 127 installed in a data display region 410, the apparatus log 123, the apparatus soundness indicators 124, and the apparatus sound state determination result 125 which have been copied into the data storage region 400 at the data collection program 122, for example, displaying trends thereof and/or a state as of this point in time.

A maintenance plan formulation program 128 will be described below. The maintenance plan formulation program 128 receives, as an input, mainly the apparatus soundness indicators 124 which have been copied into the data storage region 400 in the data collection program 122, and evaluates a degradation condition of each component from corresponding one of the apparatus soundness indicators 124. The maintenance plan formulation program 128 produces a list of components deemed to be normal in the apparatus sound state determination without reaching predictive abnormal conditions, which are grouped into: component (s) having the potential for becoming predictive abnormal conditions in future and required to be maintained in a concentrated manner in the next regular maintenance; and conversely, components having negligible degradation conditions without requiring no maintenance, or presenting no problem due to negligible maintenance. The maintenance plan formulation program 128 displays the listed components on a maintenance plan monitor 129 installed in the data display region 410.

As a result, the optimization and efficiency in regular maintenance job are enabled and a reduction in apparatus downtime and a reduction in resource cost are expected.

According to examples, a system (100) may be provided in which, for swapping, deleting, or newly registering an algorithm (114, 117, 119) for analyzing the apparatus state quantity, on the system (100), the swapping, deleting, or newly registering operation in question may be performed without modification to any program in the system (100), and also the state quantity of a component of interest may be automatically analyzed by use of an arbitrary event trigger.

Specifically, in a plasma etching apparatus (101), sensor data (102) obtained by using various sensors to measure the state quantities of components (CNP1, CNP2, etc.) making up the plasma etching apparatus (101) is collected from the sensor group in question via a LAN network and/or the like by an arbitrary trigger such as a preset apparatus event trigger and a preset time interval. Then, a single analysis algorithm (114) or a plurality of analysis algorithms (114) previously registered as an application in the system (100) in question is executed with the collected sensor data (collection data) (110) as an input to the algorithm. As an analysis output of the analysis algorithm (114), indicators (116) representing respectively the degrees of soundness for various conditions of the apparatus (101) are calculated. The soundness indicators (116) are accumulated in a database, a file, and/or the like, and as required a learning algorithm (117) is executed with the soundness indicators (116) group as an input thereto. As a result of execution of the learning algorithm (117), a reference space (threshold spatial data 118) under normal operation is calculated. A determination algorithm (119) is executed with the soundness indicator (116) group and the reference space (118) as an input thereto in order to perform a predictive diagnosis of the plasma etching apparatus (101) to be analyzed. Thereby, preventive maintenance for the plasma etching apparatus (101) to be analyzed is performed to prevent a malfunction. In the system (100), the analysis algorithm (114), the learning algorithm (117), and the determination algorithm (119) may be implemented by AI (artificial intelligence). The soundness indicators (116) and the reference space (118) are output using results of machine learning of AI (artificial intelligence). The conditions of the plasma etching apparatus (101) are also diagnosed using the machine learning of AI (artificial intelligence).

Also, the components refer to devices and a set of structures making up the plasma etching apparatus (101) system. The components include, for example, the structures making up the plasma etching apparatus system, such as a plasma treatment chamber, in addition to the devices such as a radio frequency generation circuit.

According to the present invention, a health state of the components of the plasma etching apparatus (101) is monitored at all times. And, when a component is under abnormal conditions or abnormality is not reached but predicted, this is notified to an administrator or a worker of the apparatus or the like accordingly. Thus, non-regular maintenance itself may be prevented by taking suitable measure before the non-regular maintenance is required. Also, even if the non-regular maintenance is required, since there is room for adjusting the resource in advance, a reduction in downtime as compared to usual non-regular maintenance is expected. Further, the soundness indicator for each component may be visualized and analyzed. Therefore, a basic plan of maintenance in the next regular maintenance may be formulated for each apparatus. Thus, the optimization and efficiency in regular maintenance are enabled, which may contribute to reduction of downtime.

The invention made by the inventors has been described in detail based on examples, but the present invention is not limited to the above-described embodiments and examples. It should be understood that various changes can be made.

REFERENCE SIGNS LIST

100 . . . semiconductor device manufacturing system,
101 . . . plasma etching apparatus
102 . . . sensor data,
103 . . . apparatus state quantity,
104 . . . apparatus log,
105 . . . treatment chamber,
106 . . . transfer chamber,
107 . . . edge system,
108 . . . communication cable,
109 . . . data collection program,
110 . . . sensor data,
111 . . . apparatus log data,
112 . . . data flow for passing the apparatus state quantity to trigger analysis program as input,
113 . . . trigger analysis program,
114 . . . apparatus soundness indicator analysis algorithm,
115 . . . learning trigger analysis program,
116 . . . apparatus soundness indicator,
117 . . . learning algorithm,
118 . . . threshold spatial data,
119 . . . apparatus sound state determination algorithm, 120 . . . apparatus sound state determination result,
121 . . . server system,
122 . . . data collection program in the server system,
123 . . . apparatus log,
124 . . . apparatus soundness indicator,
125 . . . apparatus sound state determination result,
126 . . . visualization program,
127 . . . apparatus state monitor,
128 . . . maintenance plan formulation program,
129 . . . maintenance plan monitor,
200 . . . host processor (HPR),
210 . . . communication cable,
220 . . . communication cable,
300 . . . data storage region,
310 . . . data processing region,
320 . . . user interface region,
330 . . . setting screen.

The invention claimed is:

1. An apparatus diagnostic system for diagnosing conditions of a semiconductor manufacturing apparatus, comprising:
an apparatus diagnostic apparatus comprising a computer configured to
store a plurality of first algorithms each comprising a set of programmed instructions that, when executed by the computer, cause the computer to analyze a state quantity of the semiconductor manufacturing apparatus;
setting a trigger indication at the semiconductor manufacturing apparatus;
upon receiving the trigger indication from the semiconductor processing apparatus corresponding to operation of a control component of the semiconductor manufacturing apparatus during plasma processing of a sample by the semiconductor manufacturing apparatus
swapping, deleting, or newly-registering one of the plurality of first algorithms to select one of the plurality of first algorithms for execution without modifying a system program of the apparatus diagnostic apparatus; and
executing the selected first algorithm to determine one or more apparatus soundness indicators for the state quantity of the semiconductor manufacturing apparatus associated with the trigger indication;
output the soundness indicators determined using the executed first algorithm along with sensor data collected from the semiconductor manufacturing apparatus as an input to the first algorithm;
output threshold spatial data under normal conditions of the semiconductor manufacturing apparatus by a second algorithm using the determined soundness indicators as an input to the second algorithm; and
diagnose conditions of the semiconductor manufacturing apparatus by a third algorithm using the soundness indicators and the threshold spatial data as an input to the third algorithm,
wherein the soundness indicators are indicators concerning a degree of soundness of conditions of the semiconductor manufacturing apparatus.

2. The apparatus diagnostic system according to claim 1, wherein either the soundness indicators or the threshold spatial data is output using machine learning or the conditions of the semiconductor manufacturing apparatus are diagnosed using machine learning.

3. The apparatus diagnostic system according to claim 1, wherein the selected first algorithm includes either a single algorithm or a plurality of algorithms.

4. The apparatus diagnostic system according to claim 1, wherein the sensor data is collected by use of either the trigger indication corresponding to the operation of the component included in the semiconductor manufacturing apparatus or a trigger indication corresponding to a treatment of the semiconductor manufacturing apparatus.

5. The apparatus diagnostic system according to claim 1, wherein the apparatus diagnostic apparatus is a personal computer.

6. The apparatus diagnostic system according to claim 1, further comprising a server that collects data from the apparatus diagnostic apparatus and performs, based on the collected data, either an analysis related to preventive maintenance for preventing failure in the semiconductor manufacturing apparatus or an analysis related to maintenance techniques.

7. An apparatus diagnostic system, comprising:
an apparatus diagnostic apparatus connected to a server over a network to diagnose conditions of a semiconductor manufacturing apparatus;
wherein the apparatus diagnostic apparatus comprises a computer configured to set a trigger indication at the semiconductor manufacturing apparatus;
store a plurality of first algorithms each comprising a set of programmed instructions that, when executed by the computer, cause the computer to analyze a state quantity of the semiconductor manufacturing apparatus;
upon receiving the trigger indication from the semiconductor processing apparatus corresponding to operation of a control component of the semiconductor manufacturing apparatus during plasma processing of a sample by the semiconductor manufacturing apparatus
swapping, deleting, or newly-registering one of the plurality of first algorithms to select one of the plurality of first algorithms for execution without modifying a system program of the apparatus diagnostic apparatus; and
executing the selected first algorithm to determine one or more apparatus soundness indicators for the state quantity of the semiconductor manufacturing apparatus associated with the trigger indication;
output the soundness indicators determined using the executed first algorithm along with sensor data collected from the semiconductor manufacturing apparatus as an input to the first algorithm;
output threshold spatial data under normal conditions of the semiconductor manufacturing apparatus by a second algorithm using the determined soundness indicators as an input to the second algorithm; and
diagnose conditions of the semiconductor manufacturing apparatus by a third algorithm using the soundness indicators and the threshold spatial data as an input to the third algorithm,
wherein the soundness indicators are indicators concerning a degree of soundness of conditions of the semiconductor manufacturing apparatus, and
wherein the server collects data from the apparatus diagnostic apparatus and performs, based on the collected data, either an analysis related to preventive maintenance for preventing failure in the semiconductor manufacturing apparatus or an analysis related to maintenance techniques.

8. The apparatus diagnostic system according to claim 7, further comprising the server.

9. The apparatus diagnostic system according to claim 7, wherein either the server is placed within a semiconductor device Fab or the server is placed outside the semiconductor device Fab.

10. An apparatus diagnostic apparatus for diagnosing conditions of a semiconductor manufacturing apparatus, comprising:
a processor configured to
set a trigger indication at the semiconductor manufacturing apparatus;
store a plurality of first algorithms each comprising a set of programmed instructions that, when executed by the computer, cause the computer to analyze a state quantity of the semiconductor manufacturing apparatus;
upon receiving the trigger indication from the semiconductor processing apparatus corresponding to operation of a control component of the semiconductor manufacturing apparatus during plasma processing of a sample by the semiconductor manufacturing apparatus
swapping, deleting, or newly-registering one of the plurality of first algorithms to select one of the plurality of first algorithms for execution without modifying a system program of the apparatus diagnostic apparatus; and
executing the selected first algorithm to determine one or more apparatus soundness indicators for the state quantity of the semiconductor manufacturing apparatus associated with the trigger indication;
output the soundness indicators determined using the executed first algorithm along with sensor data collected from the semiconductor manufacturing apparatus as an input to the first algorithm;
output threshold spatial data under normal conditions of the semiconductor manufacturing apparatus by a second algorithm using the determined soundness indicators as an input to the second algorithm; and
diagnose conditions of the semiconductor manufacturing apparatus by a third algorithm using the soundness indicators and the threshold spatial data as an input to the third algorithm,
wherein the soundness indicators are indicators concerning a degree of soundness of conditions of the semiconductor manufacturing apparatus.

11. A semiconductor device manufacturing system, comprising:
a platform to which a semiconductor manufacturing apparatus is connected over a network, the platform comprising a processor and a sequence of programmed instructions that, when executed by the processor, cause the processing to perform operations for diagnosing conditions of the semiconductor manufacturing apparatus,
wherein the operations comprise the steps of
setting a trigger indication at the semiconductor manufacturing apparatus;
upon receiving a the trigger indication from the semiconductor processing apparatus corresponding to operation of a control component of the semiconductor manufacturing apparatus during plasma processing of a sample by the semiconductor manufacturing apparatus
swap, delete, or newly-register one of a plurality of first algorithms to select one of the plurality of first algorithms for execution without modifying a system program of the platform; and
executing the selected first algorithm to determine one or more apparatus soundness indicators for the state quantity of the semiconductor manufacturing apparatus associated with the trigger indication;
outputting the soundness indicators determined using the executed first algorithm along with sensor data collected from the semiconductor manufacturing apparatus as an input to the first algorithm;
outputting threshold spatial data under normal conditions of the semiconductor manufacturing apparatus by a second algorithm using the determined soundness indicators as an input to the second algorithm; and
diagnosing conditions of the semiconductor manufacturing apparatus by a third algorithm using the soundness indicators and the threshold spatial data as an input to the third algorithm,
wherein the soundness indicators are indicators concerning a degree of soundness of conditions of the semiconductor manufacturing apparatus.

12. An apparatus diagnostic method for diagnosing conditions of a semiconductor manufacturing apparatus, comprising:
setting a trigger indication at the semiconductor manufacturing apparatus;
upon receiving the trigger indication from the semiconductor processing apparatus corresponding to operation of a control component of the semiconductor manufacturing apparatus during plasma processing of a sample by the semiconductor manufacturing apparatus
swapping, deleting, or newly-registering one of a plurality of first algorithms to select one of the plurality of first algorithms for execution without modifying a system program; and
executing the selected first algorithm to determine one or more apparatus soundness indicators for the state quantity of the semiconductor manufacturing apparatus associated with the trigger indication;
outputting the soundness indicators determined using the executed first algorithm along with sensor data collected from the semiconductor manufacturing apparatus as an input to the first algorithm;
outputting threshold spatial data under normal conditions of the semiconductor manufacturing apparatus by a second algorithm using the determined soundness indicators as an input to the second algorithm; and
diagnosing conditions of the semiconductor manufacturing apparatus by a third algorithm using the soundness indicators and the threshold spatial data as an input to the third algorithm,
wherein the soundness indicators are indicators concerning a degree of soundness of conditions of the semiconductor manufacturing apparatus.

* * * * *